(12) United States Patent
Amini et al.

(10) Patent No.: US 11,875,566 B1
(45) Date of Patent: Jan. 16, 2024

(54) ANOMALOUS ACTIVITY RECOGNITION IN VIDEOS

(71) Applicants: Mohammadhadi Amini, Miami, FL (US); Naphtali D. Rishe, Miami, FL (US); Khandaker Mamun Ahmed, Miami, FL (US)

(72) Inventors: Mohammadhadi Amini, Miami, FL (US); Naphtali D. Rishe, Miami, FL (US); Khandaker Mamun Ahmed, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 18/484,039

(22) Filed: Oct. 10, 2023

(51) Int. Cl.
*G06V 20/40* (2022.01)
*G06T 5/00* (2006.01)
*G06T 7/10* (2017.01)
*G06T 5/40* (2006.01)
*G06V 10/82* (2022.01)
*G06V 10/94* (2022.01)
*G06V 20/52* (2022.01)

(52) U.S. Cl.
CPC ............ *G06V 20/44* (2022.01); *G06T 5/002* (2013.01); *G06T 5/40* (2013.01); *G06T 7/10* (2017.01); *G06V 10/82* (2022.01); *G06V 10/945* (2022.01); *G06V 20/46* (2022.01); *G06V 20/49* (2022.01); *G06V 20/52* (2022.01); *G06T 2207/10016* (2013.01); *G06T 2207/20084* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 11,816,148 | B1* | 11/2023 | Challiyil | G06V 40/172 |
| 2023/0267742 | A1* | 8/2023 | Chembakassery | G06F 18/27 |
| | | | | 382/103 |
| 2023/0306742 | A1* | 9/2023 | Dearth | G06V 20/50 |
| | | | | 382/103 |
| 2023/0368419 | A1* | 11/2023 | Yoshida | G06F 16/583 |

* cited by examiner

*Primary Examiner* — Vikkram Bali
(74) *Attorney, Agent, or Firm* — Saliwanchik, Lloyd & Eisenschenk (57) ABSTRACT

Systems and methods are provided for detecting one or more anomalous events in video. Histogram-based noise cleansing, higher-order deep convolutional neural network-based feature extraction, instance segmentation, instance summation, difference calculation, and normalization can be used. Human-in-loop systems and methods can facilitate human decisions for anomaly detection. The decision of an anomaly event can be made by, for example, the instance difference value(s).

20 Claims, 4 Drawing Sheets

ANOMALOUS ACTIVITY RECOGNITION IN VIDEOS

GOVERNMENT SUPPORT

This invention was made with government support under 17STCIN00001 awarded by the Department of Homeland Security, Science and Technology. The government has certain rights in the invention.

BACKGROUND

In order to monitor certain areas with the aim of detecting anomalous events, surveillance cameras are typically placed in critical infrastructure, such as public gathering places, airports, railway stations, and schools. However, the conventional way of monitoring such cameras is not efficient, where a human agent looks over videos from multiple cameras on monitors.

BRIEF SUMMARY

Embodiments of the subject invention provide novel and advantageous systems and methods for detecting one or more anomalous events (e.g., explosion, fighting, or shooting) in videos. Systems and methods can include histogram-based noise cleansing, higher-order deep convolutional neural network-based feature extraction, instance segmentation, instance summation, difference calculation, and normalization. Embodiments enable human-in-loop systems and methods that facilitate human decisions for anomaly detection. The decision of an anomaly event can be made by, for example, the instance difference value (spike), where the highest value(s) indicates the location of an anomaly event, if any is/are present.

In an embodiment, a system for detecting one or more anomalous events in a video can comprise a processor and a machine-readable medium in operable communication with the processor and having instructions stored thereon that, when executed by the processor, perform the following steps: a) receiving (e.g., from one or more cameras, wirelessly or in a wired manner) the video data; b) optionally performing a noise cleansing on the video data to provide cleansed video data; c) optionally performing feature extraction on the cleansed video data using a neural network to give feature-extracted video data; d) optionally performing instance segmentation on the feature-extracted video data to give a plurality of segmented instances, each segmented instance of the plurality of segmented instances representing a predetermined amount of time (e.g., one second) of the feature-extracted video data; e) optionally performing instance summation on the plurality of segmented instances by calculating a sum of extracted feature values on each segmented instance of the plurality of segmented instances, to give a plurality of segmented instance sums; f) optionally performing instance difference calculation on the plurality of segmented instance sums to determine a plurality of difference values for the plurality of segmented instance sums, respectively; g) optionally normalizing the plurality of difference values to give a plurality of normalized difference values, each normalized difference value of the plurality of normalized difference values representing how different each instance is to at least one adjacent instance; and h) if the normalized difference value for a given instance is greater than a predetermined threshold, marking the given instance as an anomalous event. The neural network can be a deep convolutional neural network. The noise cleansing can be a histogram-based noise cleansing. The performing of the feature extraction can comprise using a pretrained model (e.g., a convolutional neural network that is 16 layers deep). The instructions when executed can perform no feature classification step (i.e., feature classification can be completely excluded such that it is not performed at all by the system during anomalous event detection). The system can further comprise a display in operable communication with the processor and the machine-readable medium. The instructions when executed can further perform the following step: i) displaying any detected anomalous event on the display for a user to review and verify (and make an appropriate decision and/or take appropriate action if the detected anomalous event is not a false alarm). The video data can be surveillance video data from at least one surveillance camera.

In another embodiment, a method for detecting one or more anomalous events in a video can comprise: a) performing (e.g., by a processor) a noise cleansing on the video data to provide cleansed video data; b) optionally performing (e.g., by the processor) feature extraction on the cleansed video data using a neural network to give feature-extracted video data; c) optionally performing (e.g., by the processor) instance segmentation on the feature-extracted video data to give a plurality of segmented instances, each segmented instance of the plurality of segmented instances representing a predetermined amount of time (e.g., one second) of the feature-extracted video data; d) optionally performing (e.g., by the processor) instance summation on the plurality of segmented instances by calculating a sum of extracted feature values on each segmented instance of the plurality of segmented instances, to give a plurality of segmented instance sums; e) optionally performing (e.g., by the processor) instance difference calculation on the plurality of segmented instance sums to determine a plurality of difference values for the plurality of segmented instance sums, respectively; f) optionally normalizing (e.g., by the processor) the plurality of difference values to give a plurality of normalized difference values, each normalized difference value of the plurality of normalized difference values representing how different each instance is to at least one adjacent instance; and g) if the normalized difference value for a given instance is greater than a predetermined threshold, marking (e.g., by the processor) the given instance as an anomalous event. The neural network can be a deep convolutional neural network.

The noise cleansing can be a histogram-based noise cleansing. The performing of the feature extraction can using a pretrained model (e.g., a convolutional neural network that is 16 layers deep). The method can exclude the performance of any feature classification step (i.e., feature classification can be completely excluded such that it is not performed at all during anomalous event detection). The method can further comprise: h) displaying any detected anomalous event on a display for a user to review and verify. The method can further comprise: i) reviewing, by the user, the detected anomalous event; j) if the detected anomalous event is an actual anomalous event, taking action (e.g., contacting law enforcement) to address the anomalous event. The video data can be surveillance video data from at least one surveillance camera.

BRIEF DESCRIPTION OF DRAWINGS

FIG. 4B shows an image of video frames from a video. These figures present the result of a successful anomaly event localization, according to an embodiment of the subject invention. The highest difference value in FIG. 4A indicates the correct location of an anomaly event within a video (an explosion), and the images in FIG. 4B confirm the explosion (see, e.g., frames 2567-2572, which are in the seventh through twelfth columns in the sixth row of images).

DETAILED DESCRIPTION

Embodiments of the subject invention provide novel and advantageous systems and methods for detecting one or more anomalous events (e.g., explosion, fighting, or shooting) in a video. Systems and methods can include histogram-based noise cleansing, higher-order deep convolutional neural network-based feature extraction, instance segmentation, instance summation, difference calculation, and normalization. Embodiments enable human-in-loop systems and methods that facilitate human decisions for anomaly detection. The decision of an anomaly event can be made by, for example, the instance difference value (spike), where the highest value(s) indicates the location of an anomaly event, if any is/are present (i.e., if the difference value exceeds a predetermined threshold, it can be determined that the instance has an anomalous event).

Embodiments of the subject invention provide artificial intelligence (AI)-aided anomaly event detection systems and methods that can assist human agents and do not require any prior knowledge of the data or dataset (i.e., the video(s)) and operate in an unsupervised manner. Anomaly localization is done by understanding the spatiotemporal relation of the frames within the video, thereby eliminating or inhibiting the need for manually labeled training datasets. Systems and methods can include end-to-end neural network-based anomaly detection and histogram-based noise cleansing can be used to remove noisy frames from the data. Human-in-loop verification can be used for better detection and interpretation of the environment before taking further actions, such as informing law-enforcement agencies.

A deep neural network-based statistical approach can be used to detect anomalies in surveillance videos. A deep neural network can be used to extract features from the video frames and analyze them. Instance segmentation, instance difference calculation, and normalization can also be applied.

Due to increases in crime, surveillance systems are being mounted almost everywhere, from private households and corporate offices to public places like shopping malls, stations, schools, and airports. The growing use of surveillance cameras is due to the desire to secure areas and decrease disruptive events such as robbery, fighting, shoplifting, or shooting. It can also help to minimize casualties even if an unexpected event happens. For instance, if a car crashes, a traffic surveillance monitoring room can call 911 to quickly get emergency help to the affected people.

Surveillance cameras can capture video for any desired amount of time (e.g., continuously, such as 24 hours a day and seven days a week). In the traditional approach, monitoring the captured videos is done by human agents. However, it is very difficult to manually monitor a large amount of video footage to detect any suspicious activity. Therefore, this traditional approach is error-prone, expensive, and inefficient, as it is not always possible for a human agent to monitor surveillance camera data to detect suspicious activities. As a result, in order to accelerate the suspicious activity detection process, an efficient, automated, and intelligent detection system and method is highly desirable. Embodiments of the subject invention provide such systems and methods.

Anomaly detection has wide applications in diverse fields, including violence alerting, foul play detection, crime detection, and intelligent surveillance. The term "anomaly" refers to events that deviate from normal behavior (e.g., robbery, fighting, stealing, or shooting). Anomaly detection is a challenging task, as anomalous events occur rarely, and it is extremely difficult to gather different kinds of anomalous data and tackle the problem with classification methods. Two possible approaches for this detection process are: (1) multiple instance learning (MIL), where the input video footage is converted to a set of bags, and a model is trained with positive and negative bags (see also Sultani et al., Real-world anomaly detection in surveillance videos, Proceedings of the IEEE conference on computer vision and pattern recognition, 2018; which is hereby incorporated by reference herein in its entirety); and (2) reconstruction error-based approach, where a future frame is predicted, and if the reconstruction error between the reconstructed frame and the actual frame significantly deviates, it is detected as an anomalous frame (see Luo et al., A revisit of sparse coding based anomaly detection in stacked RNN framework, Proceedings of the IEEE international conference on computer vision, 2017; and Keval et al., Any-shot sequential anomaly detection in surveillance videos, Proceedings of the IEEE/CVF Conference on Computer Vision and Pattern Recognition Workshops, 2020; both of which are hereby incorporated by reference herein in their entireties). These approaches, along with generative adversarial network (GAN) models, auto-encoder models, and transformer models, have drawbacks, including manual annotation, dependency on the training data, and high false alarm rates.

Many embodiments of the subject invention overcome the disadvantages in the related art. Embodiments provide anomaly detection systems and methods, manual verification thereof, and an alarm method, which can provide signals to law-enforcement agencies after anomaly detection is confirmed. The anomaly detection can include a histogram-based noise cleansing method, a deep neural network-based feature extraction, an instance segmentation method, an instance difference calculation, and a normalization method. When data (e.g., video footages, such as surveillance video footage) is received by the system, it can initially perform noise cleansing, which can include the removal of black or white (e.g., all black or all white) frames. Following the noise-cleansing process, a neural network (e.g., a deep convolutional neural network) can extract the features of each frame in the video.

Figure 1:
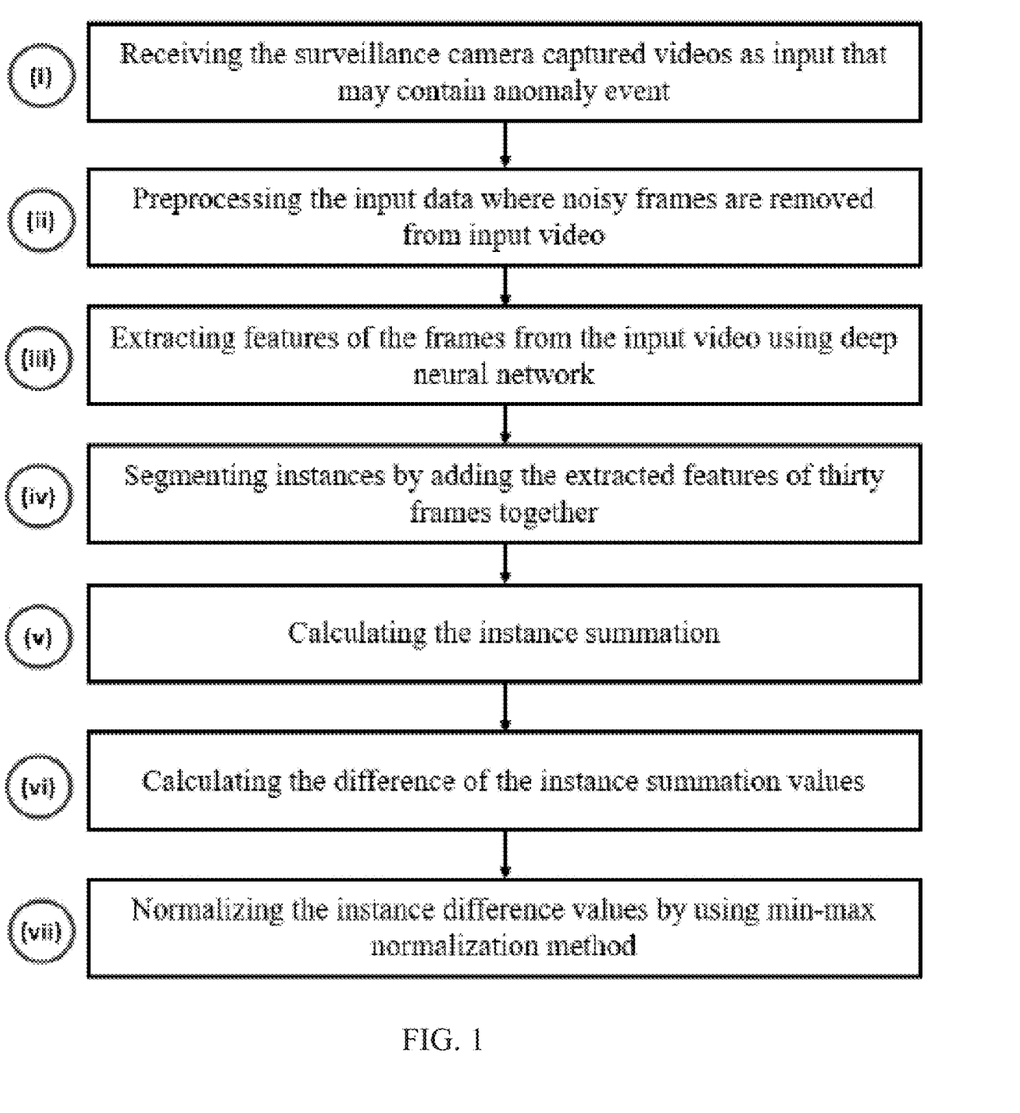
FIG. 1 shows a flow chart for detecting anomalous events in a video, according to an embodiment of the subject invention.
Figure 2:
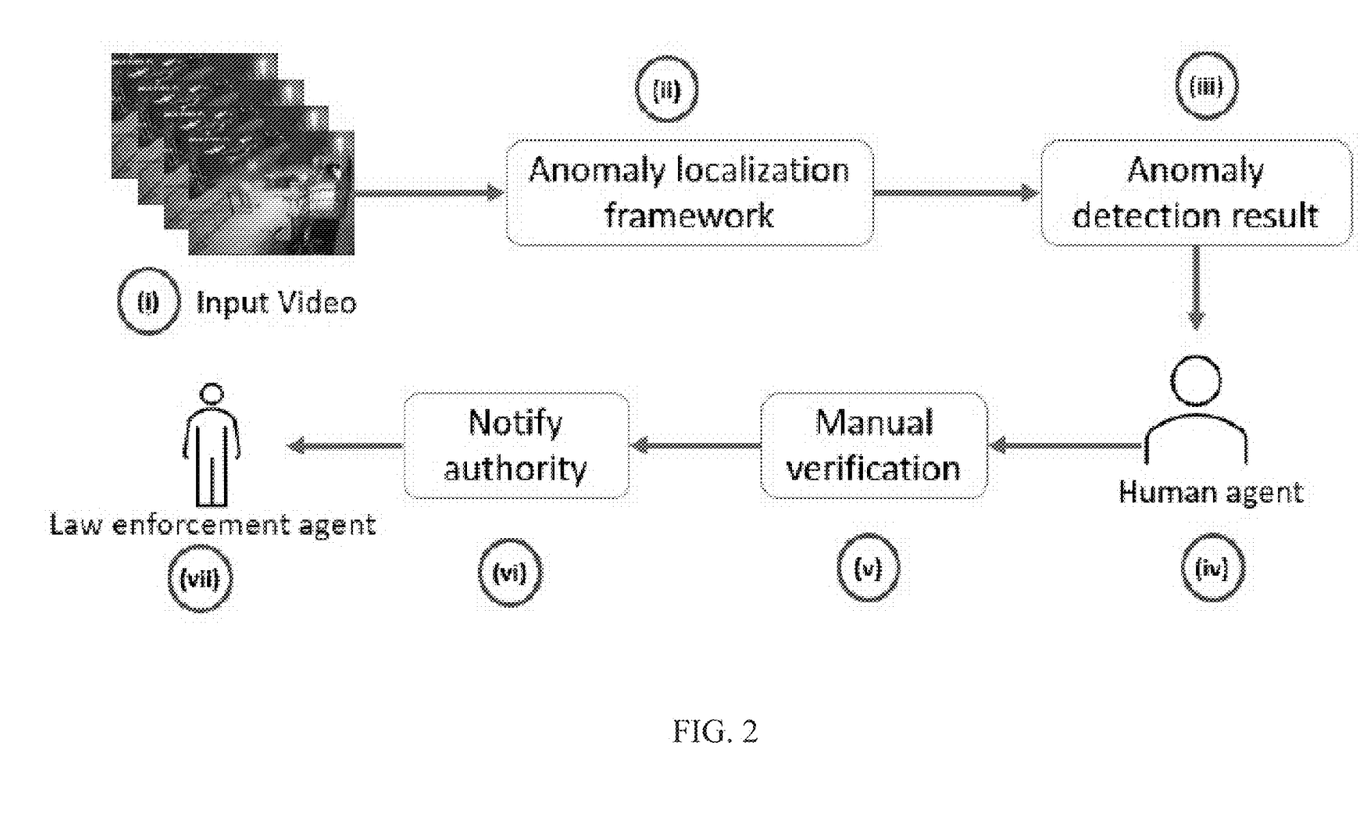
FIG. 2 shows a detailed workflow of a system for detecting anomalous events in a video, according to an embodiment of the subject invention.

FIG. 1 shows a flow chart for detecting anomalous events in video, according to an embodiment of the subject invention. FIG. 2 shows a detailed workflow of a system for detecting anomalous events in video, according to an embodiment of the subject invention. Referring to FIGS. 1 and 2, a system/method can include all of some combination of the following:

(i) input video: The input can be video footage (e.g., from surveillance cameras mounted at various locations for looking over a specific geographical area).

Figure 3:
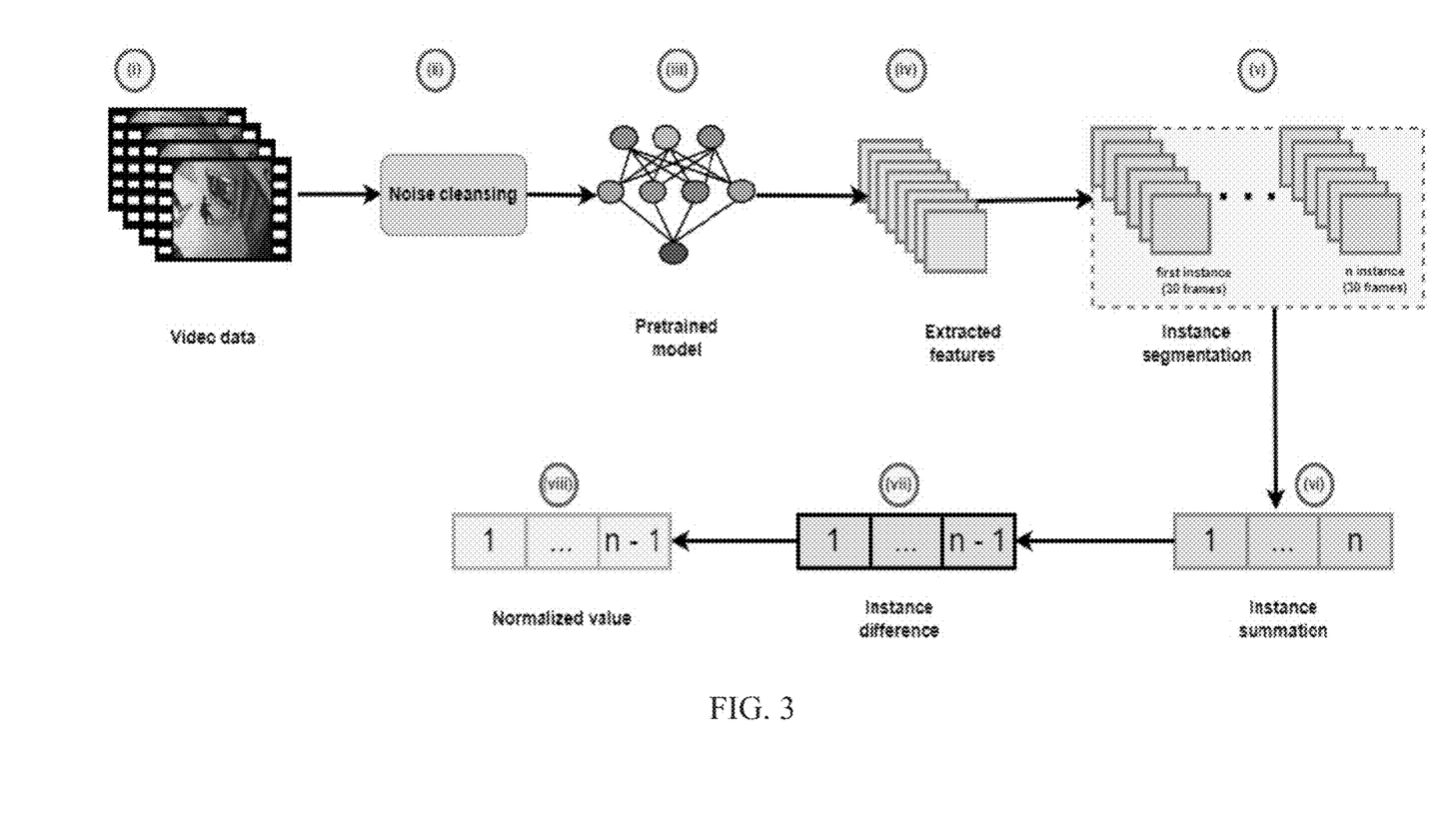
FIG. 3 shows an overall architecture of a system for detecting anomalous events in a video, according to an embodiment of the subject invention.

(ii) anomaly detection framework: The anomaly detection framework is shown in FIG. 3 and described in detail herein.

(iii) anomaly detection result: The anomaly detection framework can analyze the input video stream in order to detect anomalies within it. If there is any anomaly in the video footage, the framework can detect it and share the result with a human agent.

(iv) human agent and (v) manual verification: Human agent can refer to a person who monitors the surveillance camera data for manual verification. The anomaly detection framework helps the human agent in the identification of any disruptive event that requires special attention. When an anomaly is detected by the anomaly detection framework, it sends the result to the human agent so that the human agent can understand the situation and make an appropriate decision about it and/or take appropriate action. The involvement of a human agent minimizes the number of false alarms. The anomaly event detection is situation based, which means it depends on the environment. For example, an abandoned bag in an airport is abnormal, whereas an abandoned bag in a school is normal. Sometimes, it is hard to understand the situation by an intelligent system, and in such situations, a human agent can play a significant role.

(vi) notify authority and (vii) law enforcement agencies: When the manual verification confirms an anomaly event, the human agent can notify a law enforcement agency to take appropriate action with respect to the anomaly event.

Anomaly events are not common, and they have a significant deviation from normal events. Based on this assumption, the problem can be formulated as a deep unsupervised method of anomaly detection. Given a video, $V=\{f_i\}_{i=1}^n$ with n frames, the goal is to detect and localize anomalous events. FIG. 3 shows an overall framework/architecture of a system for detecting anomalous events in video, according to an embodiment of the subject invention. Referring to FIG. 3, the overall architecture can include all of some combination of the following: (i) input data (video); (ii) noise cleansing; (iii) pretrained model; (iv) feature extraction; (v) instance segmentation; (vi) instance summation; (vii) instance difference calculation; and (viii) normalization. These are discussed in more detail below.

(i) input data: The input data in this process can be video data (e.g., surveillance video footage captured from a source). For example, the data can be from a traffic surveillance camera, an airport's monitoring camera, or a private property surveillance camera.

(ii) noise cleansing: Noise cleansing is a fundamental step for anomaly detection. Otherwise, a large volume of false-positive results could be produced. Due to many factors, such as power shortage, low-light conditions, and heat, surveillance cameras often generate noisy frames. The term noise refers to frames that are not normally generated and can lead to improper results (e.g., black or white frames, where there is no information to process). The noise cleansing can include inspecting each frame of the video footage and performing a histogram analysis generated from the color space. In the histogram, a regular color scale of 256 bins can be broken into 64 bins for three (red, green, and blue (R, G, and B)) different color channels. Based on an empirical analysis, if a histogram bin value count for a single channel exceeds a predetermined limit (e.g., 40,000), it is deemed a noisy frame and discarded. This noise cleansing significantly reduces the number of noisy frames from video footage.

(iii) pretrained model: Pretrained models are models that are trained previously on a large dataset. Pretrained models are used as feature extractors, where the input data are pre-processed by the model or portion of the model. In an embodiment, in order to extract features, a pretrained model can be used (e.g., a pretrained model trained on an image data set, such as a VGG-16 pretrained model trained on the ImageNet dataset).

(iv) feature extraction: Feature extraction transforms the raw data into a meaningful set of features that can be used in machine learning models. Feature extraction reduces the dimension of the raw data and minimizes computation complexity. In an embodiment, a model can be applied to extract features from the input data (e.g., a pretrained model such as a VGG-16 pretrained model can be applied). The VGG-16 model can include or consist of a Conv2D layer and a MaxPooling2D layer. After removing the final layer of the VGG-16 model, the (320, 240, 3) dimensional input frame can be flattened into a (1, 35840) dimensional feature vector, where the total number of model parameters is 14,724,688. The system can then remove the three fully connected (FC) layers from the model because the goal is to extract features, and there is no need to perform classification.

(v) instance segmentation: The extracted frames of the video can be segmented into a set of non-overlapping instances for post-processing. The size of the video frames can be, for example, 320×240, though embodiments are not limited thereto. The frame rate can be, for example, 30 frames per second (fps), though embodiments are not limited thereto. Data from every second can be considered an instance; for example, at a frame rate of 30 fps, 30 frames can constitute an instance. Moreover, rather than incorporating zero-padding, the system can remove the last few frames in situations where the total number of frames is not evenly divisible by the numerical frame rate in fps (e.g., not evenly divisible by 30 when the frame rate is 30 fps).

(vi) instance summation: For each instance, the sum of the instance's features' values can be calculated. In each instance, there are features extracted from a plurality of frames (e.g., 30 frames if the frame rate is 30 fps); that means the instance summation produces the discrete value of $$\sum\nolimits_{j=i*R}^{j=((i+1)*R)-1} f_j,$$

where R is the frame rate in fps. In each step the sum of R frames (e.g., 30 frames) can be calculated, where each frame is a 1-D feature vector of size (1, 35840).

$$\sum_{j=i*R}^{j=((i+1)*R)-1} f_j$$

where N is the total number of frames in a video, $$i = 0, 1, 2, \ldots \left\lfloor \frac{N}{R} \right\rfloor - 1, \text{ and } f_j = 1 - D$$

feature vector of size (1, 35840).

(vii) instance difference: An instance is an incorporation of R frames (e.g., 30 frames at a frame rate of 30 fps).

Instance difference provides the information of dissimilarity between two instances. If the instance difference is significant, it can be assumed as the location of an anomalous event. The difference of two instances is calculated as follows.

$$\Delta d = |I_{m=1, \ldots, k-1} - I_{m+1}|$$

where $\Delta d$ is an instance difference, k is the total number of instances, and $I_m$ is a sample instance, and m is an arbitrary identifier for the sample instance numbers.

Figure 4A:
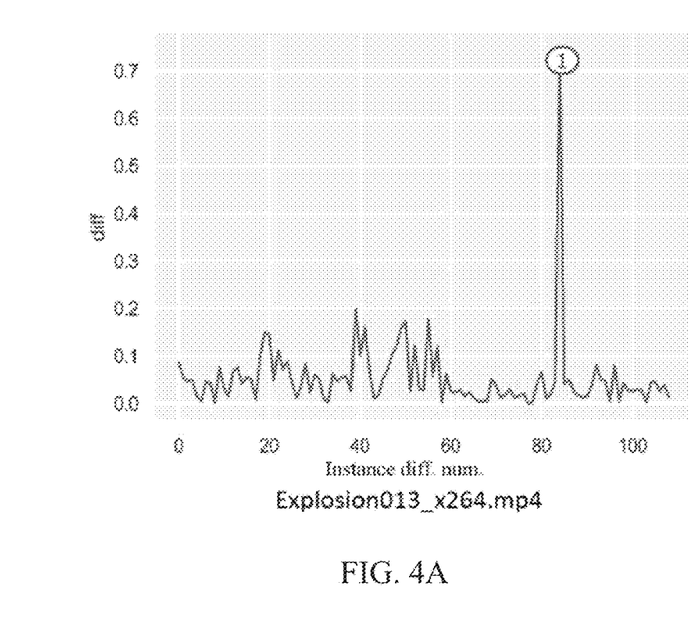
FIG. 4A shows a plot of difference versus instance difference number.
Figure 4B:
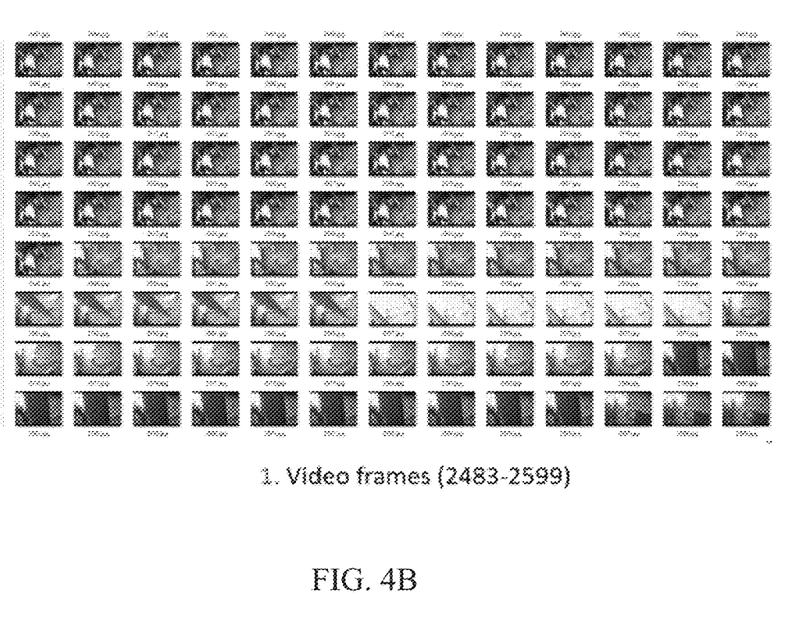

(viii) normalization: Normalization transforms data into a uniform scale or range. In an embodiment, the instance difference values can be normalized using the L2 normalization method into the range of (0, 1). After normalizing the instance differences, their dissimilarities that provide meaningful information can be better understood (see also FIG. 4). The L2 normalization is calculated as follows, where X is an input vector of length n:

$$L2 = \|X\| = \frac{X}{\sqrt[2]{\sum_{i=1}^{n} x_i^2}}$$

(ix) inference: The normalized difference value provides valuable information on the video footage. It can be assumed that anomalous events have a significant deviation from normal events as anomalous events are not common and occur infrequently. In an embodiment, the highest difference value indicates the location of an anomaly event. FIGS. 4A and 4B show the result of a successful anomaly event localization, according to an embodiment of the subject invention. Referring to FIGS. 4A and 4B, the highest difference value indicates the correct location of an anomaly event (i.e., an explosion) within a video file (a file titled "Explosion013_x264.mp4").

Embodiments of the subject invention provide systems and methods for efficient surveillance of a geographical area via data processing. In particular, the systems and methods can provide efficient threat detection in areas (e.g., at an airport) from video data (e.g., surveillance camera data). Systems and methods of embodiments of the subject can be used with or in, for example, surveillance cameras, traffic cameras, security cameras, and other video-based tools for improved surveillance and detection of anomalous events by incorporating intelligent methods and reducing human error.

Embodiments of the subject invention provide a focused technical solution to the focused technical problem of how to monitor large amounts of video data for anomalous events that can be problematic if not detected. The solution is provided by AI-aided histogram-based noise cleansing, higher-order deep convolutional neural network-based feature extraction, instance segmentation, instance summation, difference calculation, and normalization. A human agent can also be involved to review detected anomalies to minimize false alarms and make appropriate decisions and/or take appropriate action. The systems and methods of embodiments of the subject invention allow for significantly improved surveillance and detection of anomalous events while reducing human error and false alarms. Embodiments of the subject invention can improve the computer system performing the anomaly detection by not requiring it to constantly display all video data for manual review (which can free up memory and/or processor usage) and instead only needing to display detected anomalous events for human agent verification and/or action.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting one or more anomalous events in video data, the system comprising:
   a processor; and
   a machine-readable medium in operable communication with the processor and having instructions stored thereon that, when executed by the processor, perform the following steps:
   a) receiving the video data;
   b) performing a noise cleansing on the video data to provide cleansed video data;

c) performing feature extraction on the cleansed video data using a neural network to give feature-extracted video data;

d) performing instance segmentation on the feature-extracted video data to give a plurality of segmented instances, each segmented instance of the plurality of segmented instances representing a predetermined amount of time of the feature-extracted video data;

e) performing instance summation on the plurality of segmented instances by calculating a sum of extracted feature values on each segmented instance of the plurality of segmented instances, to give a plurality of segmented instance sums;

f) performing instance difference calculation on the plurality of segmented instance sums to determine a plurality of difference values for the plurality of segmented instance sums, respectively;

g) normalizing the plurality of difference values to give a plurality of normalized difference values, each normalized difference value of the plurality of normalized difference values representing how different each instance is to at least one adjacent instance; and h) if the normalized difference value for a given instance is greater than a predetermined threshold, marking the given instance as an anomalous event.

2. The system according to claim 1, the neural network being a deep convolutional neural network.

3. The system according to claim 1, the predetermined amount of time being one second.

4. The system according to claim 1, the noise cleansing being a histogram-based noise cleansing.

5. The system according to claim 1, the performing of the feature extraction comprising using a pretrained model.

6. The system according to claim 5, the pretrained model being a convolutional neural network that is 16 layers deep.

7. The system according to claim 1, the instructions when executed performing no feature classification step.

8. The system according to claim 1, further comprising a display in operable communication with the processor and the machine-readable medium, and
the instructions when executed further performing the following step:
i) displaying any detected anomalous event on the display for a user to review and verify.

9. The system according to claim 1, the video data being surveillance video data from at least one surveillance camera.

10. A method for detecting one or more anomalous events in video data, the method comprising:
a) performing a noise cleansing on the video data to provide cleansed video data;
b) performing feature extraction on the cleansed video data using a neural network to give feature-extracted video data;
c) performing instance segmentation on the feature-extracted video data to give a plurality of segmented instances, each segmented instance of the plurality of segmented instances representing a predetermined amount of time of the feature-extracted video data;
d) performing instance summation on the plurality of segmented instances by calculating a sum of extracted feature values on each segmented instance of the plurality of segmented instances, to give a plurality of segmented instance sums;
e) performing instance difference calculation on the plurality of segmented instance sums to determine a plurality of difference values for the plurality of segmented instance sums, respectively;
f) normalizing the plurality of difference values to give a plurality of normalized difference values, each normalized difference value of the plurality of normalized difference values representing how different each instance is to at least one adjacent instance; and
g) if the normalized difference value for a given instance is greater than a predetermined threshold, marking the given instance as an anomalous event.

11. The method according to claim 10, the neural network being a deep convolutional neural network.

12. The method according to claim 10, the predetermined amount of time being one second.

13. The method according to claim 10, the noise cleansing being a histogram-based noise cleansing.

14. The method according to claim 10, the performing of the feature extraction comprising using a pretrained model.

15. The method according to claim 14, the pretrained model being a convolutional neural network that is 16 layers deep.

16. The method according to claim 10, the method excluding the performance of any feature classification step.

17. The method according to claim 10, further comprising:
h) displaying any detected anomalous event on a display for a user to review and verify.

18. The method according to claim 17, further comprising:
i) reviewing, by the user, the detected anomalous event;
j) if the detected anomalous event is an actual anomalous event, taking action to address the anomalous event.

19. The method according to claim 18, the video data being surveillance video data from at least one surveillance camera, and
the action to address the anomalous event comprising contacting law enforcement.

20. A system for detecting one or more anomalous events in video data, the system comprising:
a processor;
a display; and
a machine-readable medium in operable communication with the display and the processor and having instructions stored thereon that, when executed by the processor, perform the following steps:
a) receiving the video data;
b) performing a noise cleansing on the video data to provide cleansed video data;
c) performing feature extraction on the cleansed video data using a neural network to give feature-extracted video data;
d) performing instance segmentation on the feature-extracted video data to give a plurality of segmented instances, each segmented instance of the plurality of segmented instances representing a predetermined amount of time of the feature-extracted video data;
e) performing instance summation on the plurality of segmented instances by calculating a sum of extracted feature values on each segmented instance of the plurality of segmented instances, to give a plurality of segmented instance sums;
f) performing instance difference calculation on the plurality of segmented instance sums to determine a plurality of difference values for the plurality of segmented instance sums, respectively;
g) normalizing the plurality of difference values to give a plurality of normalized difference values, each normalized difference value of the plurality of normalized difference values representing how different each instance is to at least one adjacent instance;

h) if the normalized difference value for a given instance is greater than a predetermined threshold, marking the given instance as an anomalous event; and i) displaying any detected anomalous event on the display for a user to review and verify, the predetermined amount of time being one second, the noise cleansing being a histogram-based noise cleansing, the performing of the feature extraction comprising using a pretrained model that is a convolutional neural network that is 16 layers deep, the instructions when executed performing no feature classification step, and the video data being surveillance video data from at least one surveillance camera.

* * * * *